United States Patent

Osman et al.

[11] Patent Number: 5,920,614
[45] Date of Patent: Jul. 6, 1999

[54] CITY, TIME AND TOLL-CHARGE DISPLAY WHEN CALLING TELEPHONE NUMBERS

[75] Inventors: Marwan Osman, Stittsville; Chris Luzine, Ottawa, both of Canada

[73] Assignee: Northern Telecom Limited, Montreal, Canada

[21] Appl. No.: 08/966,212

[22] Filed: Nov. 7, 1997

[51] Int. Cl.$^6$ .................................................. H04B 15/00
[52] U.S. Cl. .......................... 379/140; 379/207; 379/354
[58] Field of Search ..................... 379/130, 140, 379/142, 201, 229, 219, 220, 207, 354, 355

[56] References Cited

U.S. PATENT DOCUMENTS 5,341,413  8/1994  Hori et al. .
5,818,920  10/1998  Rignell et al. ........................... 379/229

FOREIGN PATENT DOCUMENTS 2284965  12/1994  United Kingdom .......... H04M 15/00

OTHER PUBLICATIONS

"Nortel, MCI in portable number deal" by Philip Demont, Telecom Reporter for The Financial Post (Newspaper Article published in the NEWS section of The Financial Post).
"NA007 software helps propel Nortel to top of industry" (Article published in the Oct. 1997 edition of the Nortel World).

*Primary Examiner*—Paul Loomis

[57] ABSTRACT

A method for providing information to a caller about the present physical location of a subscriber with a telephone number. The information could include time of day, city or region, and whether toll charges apply or are increased. A method is also provided for giving a telephone user information about the present physical location of a subscriber with a portable number.

4 Claims, 1 Drawing Sheet

CITY, TIME AND TOLL-CHARGE DISPLAY WHEN CALLING TELEPHONE NUMBERS

FIELD OF INVENTION

The present invention pertains to city, time and toll-charge display when calling telephone numbers, and in particular, provides a method for providing to a person who calls a portable telephone number the city, time and toll-charge of the location where the call terminates.

BACKGROUND OF THE INVENTION

Some telephone users can be given the option of having a portable number. A portable number, in North America, comprises a 3 digit area code and seven digit local number that identifies a telephone user. Traditionally, an area code and local number was specific to a particular location. If a telephone subscriber changed location, such as street address, or city, a different telephone number would be assigned to the subscriber.

In contrast, a portable number remains the same even if the subscribe moves and receives calls on a telephone set in an entirely different city or region. Thus a person could move from Washington, D.C., to San Francisco, and yet retain the same area code and 7 digit local number. This presents many advantages to telephone users. For example, friends, family and business associates would not have to learn a new phone number every time a person or business changed locations. As well, number portability may facilitate competition between local telephone companies, long-distance carriers, and cable companies. When a person moves to a different city, the portable number remains assigned to them. When they are called, the telephone switching system routes the call to the new physical location. Similarly, if the person moved to a third location, the number would remain assigned to them and any calls to that number would be routed to the third location.

However, portable telephone numbers may present new problems. For example, toll charges may apply to a called number that appears to the caller to be a local, non-toll number. Time zones may be traversed by the call and it may be inconvenient or impossible to receive a call or difficult to determine the time at the receiving location. This would be particularly true if the calling party did not know the physical location of the called party.

As well, even if the telephone number is not portable, the caller may find it useful to receive information such as the time at the location of the called number.

U.S. Pat. No. 5,341,413 to Hori et al issued Aug. 23, 1994 discloses communication equipment with a destination area on-line display function. Information relating the state, country, city or town to the dialled number is stored in customer premises equipment and connected to a telephone set or a facsimile machine.

SUMMARY OF THE INVENTION

An object of the present invention is to provide a calling party with information about the present location of the called number.

In one aspect there is provided a communications system having portable numbers comprising: (a) means to detect that a dialled number dialled by a calling party is a portable number; (b) means to associate the portable number with information related to the present location of the portable number; and, (c) means to convey the information related to the present location of the portable number to the calling party.

In another aspect there is provided a method of providing to a calling party information regarding the location of a subscriber having a portable number comprising the steps of: (a) determining whether the dialled number is a portable number; (b) retrieving information regarding the present location of the subscriber; and, (c) providing the calling party with said information.

In another aspect there is provided a method of providing to a calling party information regarding the location of a subscriber comprising the steps of: (a) retrieving information from an associated database regarding the present location of the called number; and, (b) providing the calling party with said information.

DESCRIPTION OF DRAWINGS

The present invention will be better understood from the drawings in which.

DETAILED DESCRIPTION OF THE INVENTION

Figure 1:
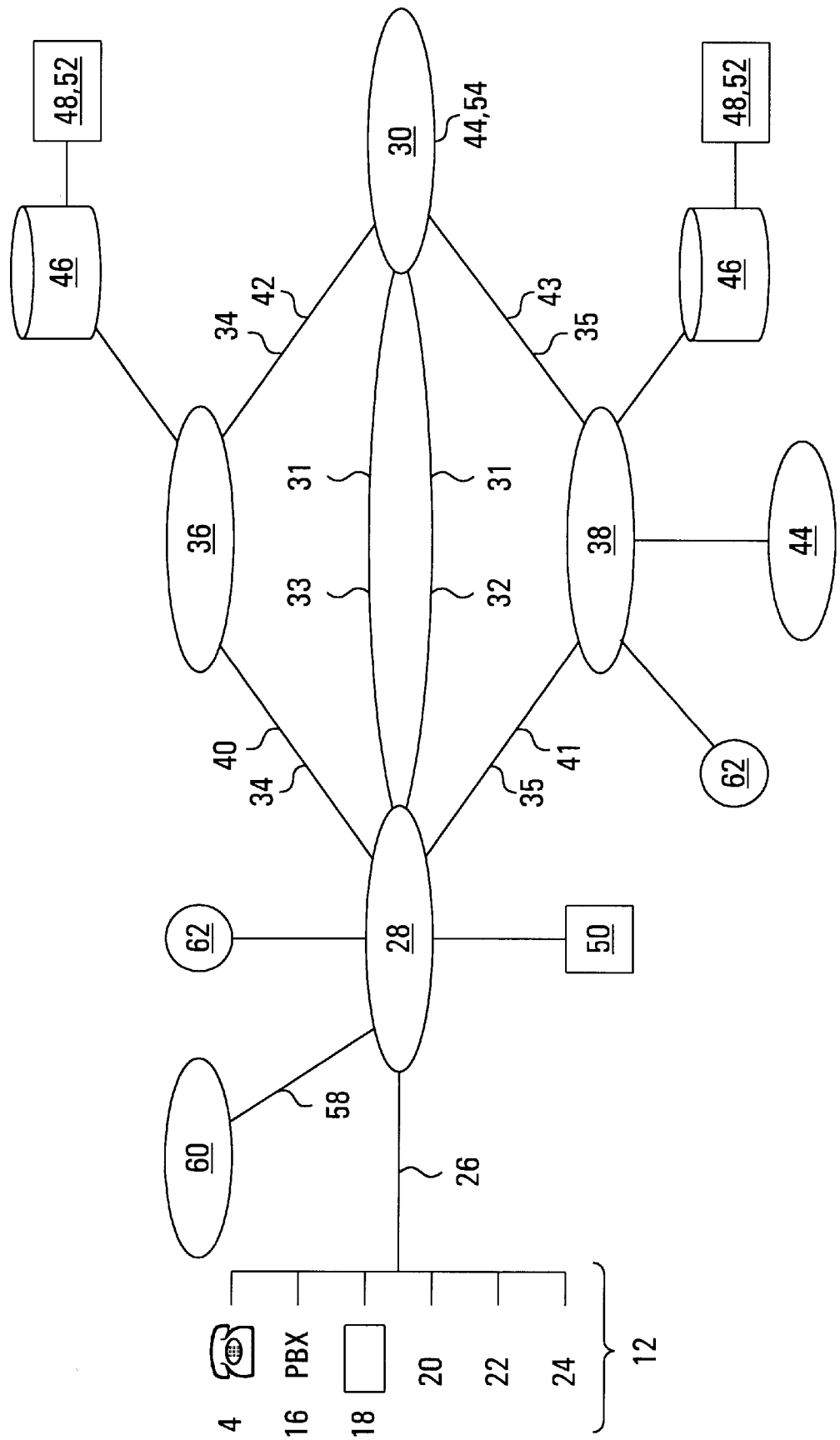
FIG. 1 shows a communication system which is an embodiment of the present invention.

FIG. 1 shows a schematic of a communications system 10 embodying the invention.

Customer-Premise Equipment 12 such as telephone set 14, PBX 16, Modem 18, facsimile machine 20, ISDN PRI 22 or ISDN BRI 24 are connected by means of a line 26 to an end office 28. The link is typically a twisted copper pair, but could also be a co-axial cable, optical fibre cable, radio link or any other link known in the art.

The end-office 28 includes a telephone switch, such as a Nortel DMS™ switch. End-office 28 is connected to another telephone switch 30 by way of a trunk 31. Some trunks 32 carry both voice and switching information, but others, such as an ISUP trunk 33 carry only voice information. In the voice-only case, another signalling link 34 to switch 30 is formed which carries signalling information which could include called number, caller name, calling card number, etc. The signalling link 34 may also contain a junction or signal transfer point 36. Alternatively, both voice link and signalling link may be paired together in a paired link 35, which passes through a tandem switch 38. The signal transfer point 36 conveys information from one portion 40 of signalling link 34 to a second portion 42. Similarly, the tandem switch 38 conveys information from one portion 41 of paired link 35 to a second portion 43. The tandem switch 38 may be connected to a plurality of telephone switches 44. Both signal transfer point 36 and tandem switch 38 can be attached to a data processor or SCP 46. Data processor or SCP 46 contains data tables 48 that may be useful in switching telephone calls or providing services to telephone users or service providers.

One preferred method for providing a person who calls a portable number with area, city time information is described as follows:

1. The telephone user or calling party dials the telephone number, which is signalled to end-office 28 by line 26.

2. End-office 28 determines whether the number is portable by checking the number in data look up table 50.

3. If the number is portable, a request is made to a data processor or SCP 46.

4. Data Processor or SCP 46 consults local number portability (LNP) database 52 which contains location routing information, typically a number which uniquely identifies the present telephone switch 54 where the user of a portable number is presently physically located. LNP database 52 may also contain information such as the city and local time associated with present telephone switch 54.

5. The information is then conveyed to end-office 28.

6. End-office 28 conveys this information to the telephone user in any number of ways such as unique tones or chirps heard by the telephone user or a message on a display 56 of telephone set 14, or a message sent to ISDN PRI 22 or ISDN BRI 24, or a message sent through a link 58 to data network 60. Alternatively an intelligent peripheral 62, attached to tandem switch 38 or end-office 28 could generate a synthetic voice message to be transmitted to telephone set 14 where it is heard by the telephone user.

One variation of the above method is that when a portable number has been dialled, the telephone user is simply given a warning tone, indicating that toll charges apply or may increase or that the time zone may differ.

Another variation is that the terminating end-office 30 may derive the information and send it by signalling link 34 to end-office 28.

In another variation of the above method after information is conveyed to the calling party, the telephone user must enter a signal, speak a word or press a button on the telephone set in order for the call to continue.

In another variation of the above method the called number is not a portable number. In this case the following method is implemented:

1. The telephone user or calling party dials the telephone number, which is signalled to end-office 28 by line 26.

2. A request is made to a data processor or SCP 46 connected to either signal transfer point 36 or tandem switch 38.

3. Data processor or SCP 46 consults LNP database 52 which contains a number which uniquely identifies the present telephone switch 54 where the called number is physically located. LNP database 52 may contain information such as the city and local time associated with the physical location of the called number. This information from LNP database 52 is conveyed to signal transfer point 36 or tandem switch 38.

4. The information is then conveyed to end-office 28. End-office 28 conveys this information to the telephone user in any number of ways such as unique tones or chirps heard by the telephone user or a message on a display 56 of telephone set 14, or a message sent to ISDN PRI 22 or ISDN BRI 24, or a message sent through a link 58 to data network 60. Alternatively an intelligent peripheral 62, attached to tandem switch 38 or end-office 28 could generate a synthetic voice message to be transmitted to telephone set 14 where it is heard by the telephone user.

In another variation of the above methods, data processor or SCP 46 could be connected to end office 28 or to telephone switches 44.

Numerous modifications, variations and adaptations may be made to the particular embodiments of the invention described above without departing from the scope of the invention which is defined in the claims.

What is claimed is:

1. A method of operating a supervisory control point (SCP), comprising:

receiving a portable number from an originating telephone switch;

querying a local number portability (LNP) database with said portable number;

receiving an indication of a terminating telephone switch presently associated with said portable number and ancillary information comprising at least one of an indication of a city and a time zone presently associated with said portable number;

returning said terminating telephone switch indication and said ancillary information to said originating telephone switch.

2. A method of operating an originating telephone switch, comprising:

receiving a portable number from associated telephone station apparatus;

querying a supervisory control point (SCP) with said portable number;

receiving from said SCP an indication of a terminating telephone switch presently associated with said portable number and ancillary information comprising at least one of an indication of a city and a time zone presently associated with said portable number;

passing said ancillary information to said associated telephone station apparatus;

connecting said associated telephone station apparatus through to said terminating telephone switch.

3. A telephone communications system, comprising:

an originating telephone switch;

a supervisory control point (SCP);

a local number portability (LNP) database for mapping portable telephone numbers to terminating telephone switches and ancillary information comprising at least one of an indication of a city and a time zone presently associated with said portable number;

at least one telephone station apparatus associated with said originating telephone switch including means for conveying said ancillary information to a user.

4. The system of claim 3 wherein said means comprises a display.

* * * * *